(12) United States Patent
Oberhofer et al.

(10) Patent No.: US 12,072,995 B2
(45) Date of Patent: Aug. 27, 2024

(54) MULTI-PARTITIONED GLOBAL DATA SYSTEM

(71) Applicant: International Business Machines Corporation, Armonk, NY (US)

(72) Inventors: Martin Anton Oberhofer, Sindelfingen (DE); Oliver Suhre, Stuttgart (DE); Sergej Schuetz, Stuttgart (DE); Theresa Schmitt, Markgröningen (DE); Karin Steckler, Herrenberg (DE); Hemanth Kumar Babu, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 17/549,961

(22) Filed: Dec. 14, 2021

(65) Prior Publication Data

US 2023/0185941 A1   Jun. 15, 2023

(51) Int. Cl.
*G06F 15/16* (2006.01)
*G06F 13/40* (2006.01)
(Continued)

(52) U.S. Cl.
CPC ...... *G06F 21/6218* (2013.01); *G06F 13/4027* (2013.01); *G06F 16/278* (2019.01); *G06Q 30/018* (2013.01)

(58) Field of Classification Search
CPC .......................... G06F 21/6218; G06F 16/182
See application file for complete search history.

(56) References Cited

U.S. PATENT DOCUMENTS 7,660,782 B2   2/2010   Andrews
8,180,732 B2   5/2012   Krabel et al.
(Continued)

FOREIGN PATENT DOCUMENTS

CN   106777029 A   5/2017

OTHER PUBLICATIONS

Haneem et al., "Master Data Definition and the Privacy Classification in Government Agencies: Case Studies of Local Government," Research Gate, Journal of Computational and Theoretical Nanoscience, American Scientific Publishers, Advance Science Letters, vol. 23, 2017, 6 pages.
(Continued)

*Primary Examiner* — Hieu T Hoang
(74) *Attorney, Agent, or Firm* — Peter J. Edwards

(57) ABSTRACT

A computer-implemented method for managing data records subject to placement condition rules in a distributed data management system comprising a plurality of nodes. The method may include receiving, by an endpoint management component of the distributed data management system, a request for a data record. The method may also include routing, by the endpoint management component of the distributed data management system, the request to a node of the distributed data management system. The method may also include upon determining that the request is a create request, verifying, by a service component of the distributed data management system, a placement condition rule for the data record, where the placement condition rule is retrieved from a configuration component of the distributed data management system.

23 Claims, 8 Drawing Sheets

(51) Int. Cl.
  *G06F 16/27* (2019.01)
  *G06F 21/62* (2013.01)
  *G06Q 30/018* (2023.01)

(56) References Cited

U.S. PATENT DOCUMENTS

| | | | | |
|---|---|---|---|---|
| 8,601,029 | B2* | 12/2013 | Anand | G06F 16/27 |
| | | | | 707/805 |
| 8,910,263 | B1 | 12/2014 | Martini | |
| 9,473,537 | B2 | 10/2016 | Sinha et al. | |
| 10,242,056 | B2* | 3/2019 | Piecko | G06F 16/26 |
| 10,523,710 | B2 | 12/2019 | Sinha et al. | |
| 10,642,862 | B2 | 5/2020 | MacLean | |
| 10,922,304 | B1* | 2/2021 | Todd | G06F 11/1464 |
| 11,615,082 | B1* | 3/2023 | Shrigondekar | G06F 16/245 |
| | | | | 707/769 |
| 2003/0110169 | A1* | 6/2003 | Zuili | H04L 63/04 |
| | | | | 707/999.009 |
| 2008/0010325 | A1 | 1/2008 | Yamakawa | |
| 2012/0136914 | A1* | 5/2012 | Imanishi | G11B 27/323 |
| | | | | 709/201 |
| 2012/0198036 | A1 | 8/2012 | Korovin et al. | |
| 2012/0303672 | A1* | 11/2012 | Anand | G06F 16/20 |
| | | | | 707/802 |
| 2016/0014140 | A1* | 1/2016 | Akireddy | H04L 63/20 |
| | | | | 726/1 |
| 2016/0378450 | A1* | 12/2016 | Fu | G06F 8/60 |
| | | | | 717/177 |
| 2019/0182266 | A1* | 6/2019 | Doron | H04L 63/145 |
| 2019/0197030 | A1* | 6/2019 | Li | G06F 16/2365 |
| 2019/0243804 | A1* | 8/2019 | Saito | G06F 16/11 |
| 2019/0294594 | A1* | 9/2019 | Weghorst | H04L 67/306 |
| 2019/0340273 | A1* | 11/2019 | Raman | G06F 16/2272 |
| 2020/0250050 | A1* | 8/2020 | Koester | G06F 16/162 |

OTHER PUBLICATIONS

Dreibelbis et al., "Master Data Management architecture patterns," IBM, Mar. 29, 2007, 31 pages https://www.ibm.com/developerworks/data/library/techarticle/dm-0703sauter/index.html.

"Citrix Endpoint Management," Citrix, Oct. 12, 2020, 1374 pages, https://docs.citrix.com/en-us/citrix-endpoint-management/citrix-endpoint-management.pdf.

Bethcron, "Managing Records in Mobile Environments: Addressing Records Management Implications," National Archives Records Express, Mar. 27, 2014, 6 pages.

* cited by examiner

MULTI-PARTITIONED GLOBAL DATA SYSTEM

BACKGROUND

The present disclosure relates generally to a method for managing data records subject to placement condition rules and, more specifically, to a computer-implemented method for managing data records subject to placement condition rules in a distributed data management system comprising a plurality of nodes. The invention relates further to a distributed data management system for managing data records subject to placement condition rules, and a computer program product.

SUMMARY

The present invention provides a computer-implemented method, system, and computer program product for managing data records subject to placement condition rules in a distributed data management system comprising a plurality of nodes. According to one aspect of the present invention, a computer-implemented method for managing data records subject to placement condition rules in a distributed data management system comprising a plurality of nodes may be provided. The method may include receiving, by an endpoint management component of the distributed data management system, a request for a data record. The method may also include routing, by the endpoint management component of the distributed data management system, the request to a node of the distributed data management system. The method may also include upon determining that the request is a create request, verifying, by a service component of the distributed data management system, a placement condition rule for the data record, where the placement condition rule is retrieved from a configuration component of the distributed data management system.

According to another aspect of the present invention, a distributed data management system for managing data records subject to placement condition rules may be provided. The system may include a processor and a memory, communicatively coupled to the processor, where the processor is configured to, to receive, by an endpoint management component of the distributed data management system, a request for a data record; to route, by the endpoint management component of the distributed data management system, the request to a node of the distributed data management system; and upon determining that the request is a create request, to verify, by a service component of the distributed data management system, a placement condition rule for the data record, where the placement condition rule is retrieved from a configuration component of the distributed data management system.

According to another aspect of the present invention, a computer program product for managing data records subject to placement condition rules may be provided. The computer program product including a computer readable storage medium having program instructions embodied therewith, the program instructions executable by a server to cause the server to perform a method. The method may include receiving, by an endpoint management component of the distributed data management system, a request for a data record. The method may also include routing, by the endpoint management component of the distributed data management system, the request to a node of the distributed data management system. The method may also include upon determining that the request is a create request, verifying, by a service component of the distributed data management system, a placement condition rule for the data record, where the placement condition rule is retrieved from a configuration component of the distributed data management system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
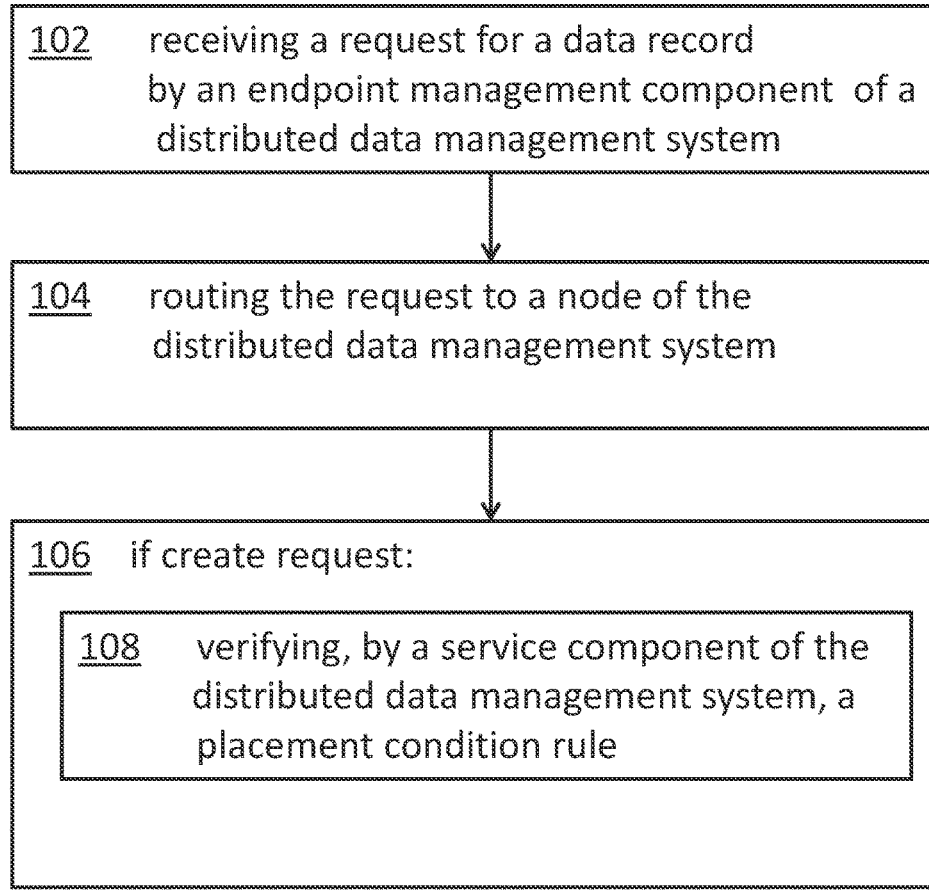
FIG. 1 depicts a block diagram of a computer-implemented method for managing data records subject to placement condition rules in a distributed data management system comprising a plurality of nodes, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In the context of this description, the following conventions, terms and/or expressions may be used:

The term 'placement condition rule' may denote an indication or rule whether a certain type of data may be allowed to be stored in a certain data center/node of the distributed data management system. The rule may reflect legal regulations in different countries.

The term 'distributed data management system' may denote a storage system for data records using a plurality of nodes located in different geographical regions with potentially different jurisdictions and different requirements for storing certain types of data within or outside a specific geographical region.

The term 'endpoint management component' may denote a component of the distributed data management system that is responsible for controlling how service requests for the data stored in the distributed data management system may be routed to the various endpoints—i.e. different nodes with associated storage in different data centers—to enable access to the stored data.

The term 'data record' may denote any data record relating to transactional—but also to analytical—systems required to control enterprise processes or technical equipment. The data records may be related to persons, organizational entities, contracts, locations, measured data, and so on. However, also LOB data (Large Object) may also be managed and controlled by the proposed concept.

The term 'service component' may denote a functional component of a node of the distributed data management system being responsible for providing CRUD services (create, read, update, delete) to read and write the data. The general functionality may be the same on all nodes in all data centers. However, local rules based on global configuration settings—e.g., data placement rules—may enforce different data integrity constraints. In any case, the services layer scales horizontally across each node in each data center to jointly support the workload of the distributed data management system.

The term 'placement condition rule' may denote conditions defining which kind of data may be stored in which node, mainly depending on the geography, i.e., the legal requirements for storing data.

Figure 3:
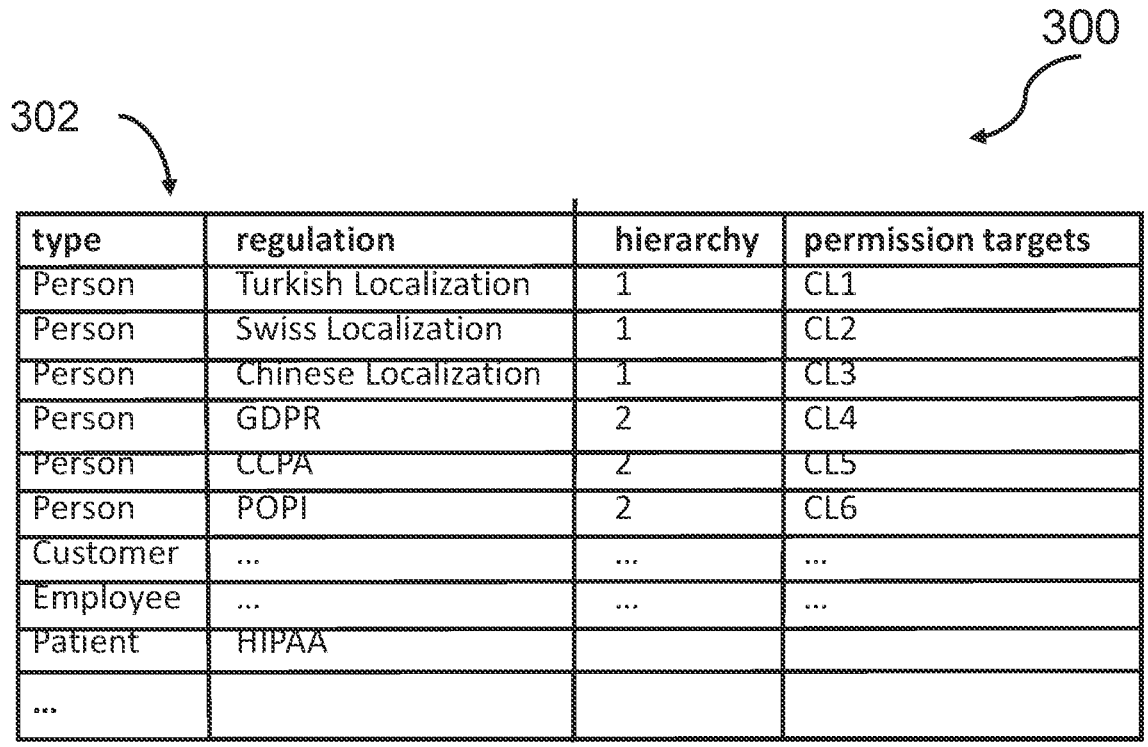
FIG. 3 depicts examples of tables of the distributed data management system with a governance configuration of placement data, according to some embodiments.
Figure 3:
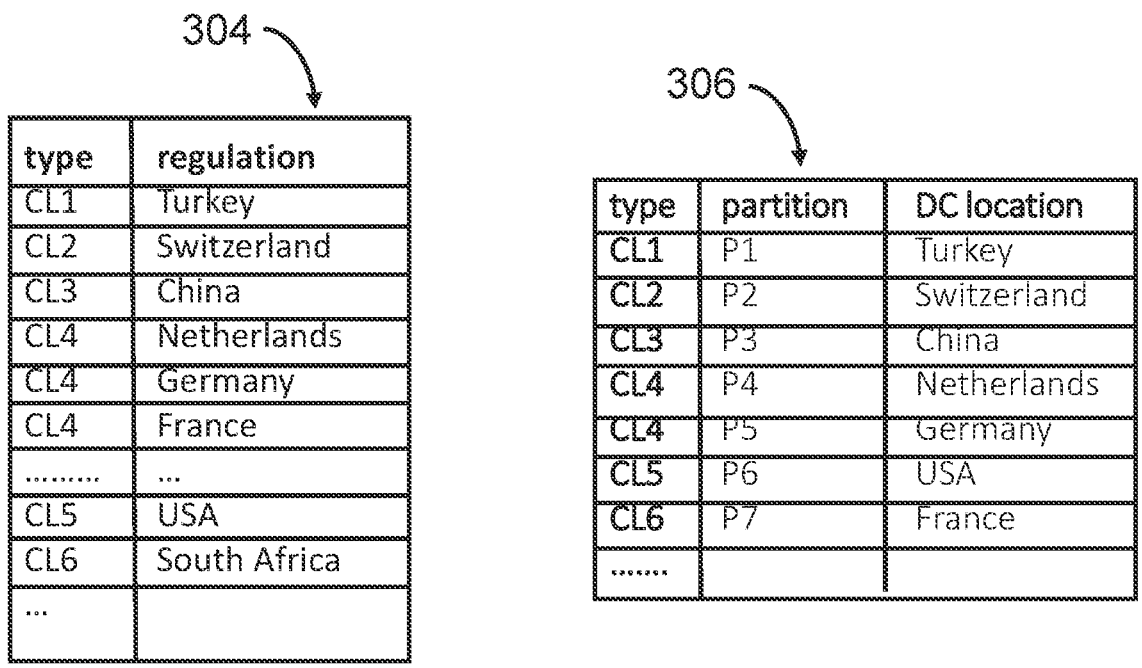

The term 'a configuration component' may denote mainly a storage area, where the placement condition rule(s) may be set into force using different database tables as exemplary discussed in the context of FIG. 3.

The term 'access permission' may denote the ability of a constituent to access data stored in a certain location, i.e., on a storage system of a node of the distributed data management system being located in a certain geography.

In contrast to multinational IT organizations, the ability to manage large amounts of data of various kinds on a global level is one of the most important success factors of global IT (information technology) organizations. However, among others, privacy laws in different jurisdictions define limitations for consistent data management. For example, regulations in certain countries or regions do not allow certain types of data to be moved across country borders (for example, customer data). Some countries or geographical regions may require that the customer data of the countries/geographical regions are stored on storage systems located in this/these territories. On the other side, more abstract data like contract conditions may be stored anywhere, because no personal data are involved.

Under a different aspect, it is often a strong requirement to store local copies of certain data in a variety of different storage locations in order to allow a good user experience in terms of fast data access. However, latency of networks does not allow the same speed of data access on a global scale.

For example, for banks that want to be the payment provider of choice for globally operating companies with direct customer touch points, it is an absolute requirement that these banks are able to find and verify customer profile requests for payment or reservations as fast as possible.

In addition, certain data management functions, such as matching, require the broadest possible and fastest possible access to all records to maintain a "golden record" (i.e., a single version of truth for a specific application and business process purpose).

This results in conflicting requirements, as various regulations do not allow certain types of data to be moved into other territories, however globally fast access and fast performance as well as broad access to records are also desired.

The present invention provides a computer-implemented method, system, and computer program product for managing data records subject to placement condition rules in a distributed data management system comprising a plurality of nodes. The proposed computer-implemented method, system, and computer program product for managing data records subject to placement condition rules in a distributed data management system comprising a plurality of nodes may offer multiple advantages, technical effects, contributions and/or improvements:

The proposed concept may make it possible to implement a distributed database—or other storage system—where the records are partitioned across a larger number of nodes in different geographical regions with different rules and regulations regarding data privacy and storage requirements to allow a horizontal scalability of the workload. A beneficial aspect of this placement may also be that it is done in compliance with data privacy or other regulatory requirements expressed in rules which constrain the placement into certain physical locations but not others. For optimizing localized high performance access where permitted from a regulatory requirement perspective for a particular record copies can be placed into more than one location. This may represent a significant difference and benefit compared to known technologies which may also allow the creation of multiple copies in the persistency. However, in known technologies, there is no feature set available controlling into which physical location the built-in replication is placing the records and more specifically, there is no feature set available which allows based on values in the record where they can or cannot be physically placed in to adhere to privacy and/or regulatory requirements.

Another beneficial aspect of the proposed system may be that it may enforce referential integrity across nodes correctly. For example, if there is a record which exists on node A and B, but is not permitted to be stored on node C, but one needs to store a relationship between that record and some other record on node C, one would need to create that relationship on node C with just a technical key and/or pointer (which avoids data disclosure), for the record cannot be physically stored on node C. If that record is deleted (executed on node A and B), the proposed system prevents the deletion if the relationship on node C referring to that record cannot be deleted as well (otherwise you would have a reference with a technical key which does not point to a record anymore), or ensures that the relationship on node C referencing the record is deleted at the same time for the record which is being deleted therefore ensuring referential integrity.

Privacy rules may be reflected automatically using placement condition rules as well as global unique identifiers for records comprising the data. This may only allow storing pointers in certain nodes, the location of which may not allow certain data to be stored in that node. This way, high data security as well as high performance access to the distributed data management system may be guaranteed without violating storage location requirements. The data may be replicated to the various nodes wherever possible.

However, they are not replicated to nodes of the distributed data management system where it is not permitted.

In the following, additional embodiments of the inventive concept—applicable for the method as well as for the system—will be described.

According to one embodiment, the method may include: upon determining that the request is a read request, providing, by the service component of the distributed data management system, a result for the request to the endpoint management component. Due to the overall architecture on which the concept here is based, the access time for responding and the request rate may stay more or less constant on a global level. This may also be ensured in a region in which no local copies for certain data may be allowed.

According to one advantageous embodiment of the method, the providing—in particular, providing the result for the request—may be performed in accordance with an access permission associated with the given record. Thereby, at least one access control list (ACL) may be involved. Hence, the access permission may depend on a variety of different rules and regulations. They may be user definable.

According to an advantageous embodiment, the method may also include: upon determining that the placement condition rule does not permit storage of the data record on the node, the method may comprise storing a pointer to the record on the node. As a consequence, the clear text data may then be stored on a node where no conflict may exist with the placement condition rules. For instance, if a globally operating people transport company (e.g., a taxi company) intends to bring a European customer from a US (United States) airport to a location downtown of a nearby city and privacy laws (e.g., European GDPR) do not allow storing personal data of the European customer on a US-based storage system, then the background matching process between the identification of the customer and the taxi company's enterprise system will need to access the customer data in any case. Thus, the taxi company software application which uses the pointer to the record on the local node may access the actual customer data on a, for example, European-based node/storage system combination.

Consequently and according to another advantageous embodiment of the method, the distributed data management system—in particular one that has different storage nodes which are geographically spread—may be adapted for storing data records on nodes located in geographically different areas in which different placement condition rules, different access permissions and/or different data governance rules have to be applied. Thus, the end-user application becomes agnostic to the local data privacy rules and regulations. Personal data may be accessed in any case and without—or with just a little—data access latency which may influence the user experience negatively.

According to another embodiment of the method, a global unique identifier (GUID) may be maintained for each data record in the distributed data management system. This may be used as a pointer to access the data even if they are not stored on a local node. A global directory may enable a direct and fast data access via the pointer to a node having stored the complete record.

According to a useful embodiment of the method, the distributed data management system may be a master data management system. This may function as an information architecture backbone of globally operating enterprises. It may also be used across different enterprises as a cross-functional global data storage system.

According to a further advantageous embodiment of the method, data records may be replicated to another node of the plurality of nodes of the distributed data management system only if not violating a placement condition rule. This is advantageously done for performance reasons so that network latencies cannot be neglected. However, also in light of the replicated data, the different legal regulations are not violated.

According to an advanced embodiment of the method, the distributed data management system may include a data layer including at least one of: data records, relationship records defining relationships between data records or entities, and global unified identifiers which are used to maintain a reference record about each record and relationships between records. To achieve this easily, a reference table may be present on each node. Alternatively, a cross reference table may only be present at a very limited number of locations—e.g., only at a central place—which may have a negative effect on performance aspects but may be more tamper-proof and more verifiable (i.e., better auditability).

According to another embodiment of the method, a communication between the plurality of nodes may be performed via an event bus of which each of the nodes may execute an event bus service. This way, a globally consistent architecture of the distributed data management system may be achieved. There may be no different flavors of the different nodes of the distributed data management system in different geographical regions under different privacy laws. Additionally, the event bus mechanism may be used for a publish/subscribe architecture for end-user or application requests.

According to another embodiment of the method, the distributed data management system may also include a matching service which may be invoked whenever a data record may be created or updated. This may be instrumental to guarantee referential integrity of all data of the distributed data management system around the globe.

According to an embodiment, the method may also include: upon an update request to data in the distributed data management system, determining whether a relationship to another data record in the distributed data management system may have been deleted. Also this may be a contribution to the data integrity of the stored data. A cross reference key table may help to ensure that no "loose ends" exist in the data body of the distributed data management system.

According to another embodiment, the method may also include: upon a delete operation for a data record in the distributed data management system, determining whether a copy of the record may exist on another node of the distributed data management system. Also here, the cross reference key table may be helpful in order to ensure that also in case of at least partially deleted data in the distributed data management system referential integrity may continue to exist.

In the following, a detailed description of the figures will be given. All instructions in the figures are schematic. Firstly, a block diagram of an embodiment of the inventive computer-implemented method for managing data records subject to placement condition rules in a distributed data management system comprising a plurality of nodes is given. Afterwards, further embodiments, as well as embodiments of the distributed data management system for managing data records subject to placement condition rules will be described.

FIG. 1 shows a block diagram of a computer-implemented method 100 for managing data records subject to placement condition rules in a distributed data management system comprising a plurality of nodes. The method 100 includes receiving, 102, by an endpoint management component of the distributed data management system, a request—in particular a create request—for a data record; and routing, 104, by the endpoint management component of the distributed data management system, the request to a node of the distributed data management system (for example, in a data center).

Additionally, the method 100 includes: upon determining, 106, that the request is a create request, verifying, 108, by a service component of the distributed data management system, a placement condition rule—i.e., at least one rule—for the data record to be created. Thereby, the placement condition rule is retrieved from a configuration component of the distributed data management system, in particular from the configuration of the specific node of the distributed data management system.

If it is determined (not depicted) that a request is a read request and not a create request, the method 100 may include providing a result for the request to an endpoint management component. For example, the result may be to allow and/or confirm the read request or to decline the read request, thus declining access to the data. In an example instance, a first request may be a create request and a second request may be a read request.

Figure 2:
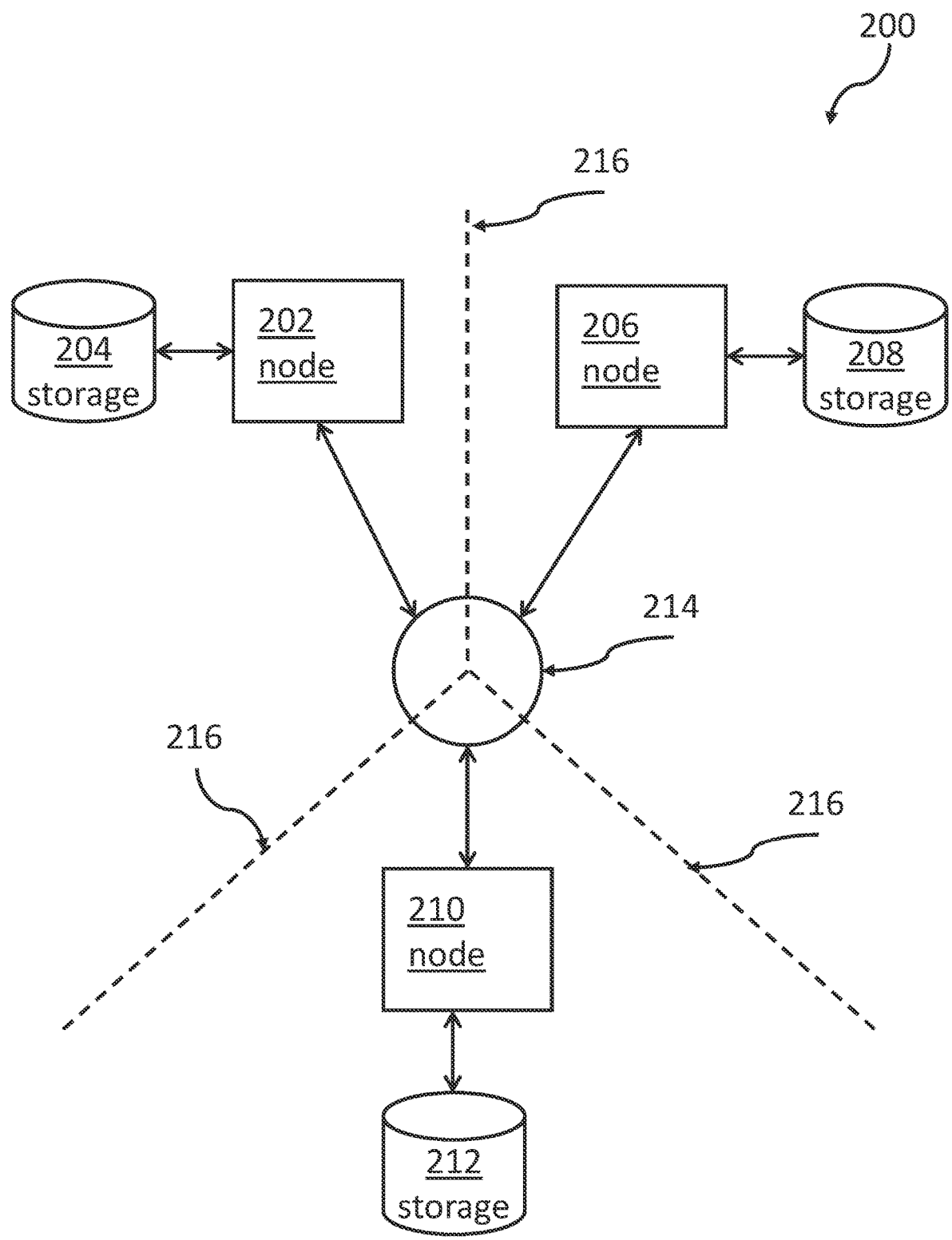
FIG. 2 depicts a block diagram of an example distributed nodes of the distributed data management system, according to some embodiments.

FIG. 2 shows a block diagram 200 of an embodiment of distributed nodes 202, 206, 210 of a distributed data management system. Each of the nodes 202, 206, 210 has an attached data store 204, 208, 212, respectively, for storing copies or pointer to copies of the distributed data management system. The ring 214 in the middle represents a network connection (e.g., WAN) between all nodes 202, 206, 210. Additionally, the dashed lines 216 represent geographical and potentially legal borders so that at least a part of the nodes 202, 208, 210 are located in geographies with different jurisdiction rules and regulations with regard to data management, in particular private data.

FIG. 3 shows a diagram 300 with examples of tables 302, 304, 306 of the distributed data management system with a governance configuration of placement data. The tables 302, 304, 306 can be managed as part of the distributed data management system (DDMS), and, in particular, as part of the configuration of the DDMS. In this instance, table 302 shows what kind of item is managed, for example, person, customer, employee, patient, and so on. Table 302 also shows examples of applicable legal regulations to be applied to the type of item. As an example, for personal data for a person in CL4, the European GDPR (General Data Privacy Regulation) has to be applied (i.e., enforced). Similarly, a person record with country code of China has to remain on a node located in a Chinese data center. The permissible target types are detailed in table 304 and the relationship between the permissible target types, partitions and data center (DC) locations are shown exemplary in table 306. For example, a CL6 type, which table 304 indicates is a South Africa regulation, has a data center (DC) located in France. It should also be mentioned that personal records with the country code of any of the EU member states (for instance, the CL4 list) can be replicated to the partitions for P4 and P5; and the respective data centers in the countries Netherlands and Germany may be available, as table 306 shows. Placement policies driving the rules may clarify if a record can be replicated to one or multiple partitions in the distributed database.

Figure 4:
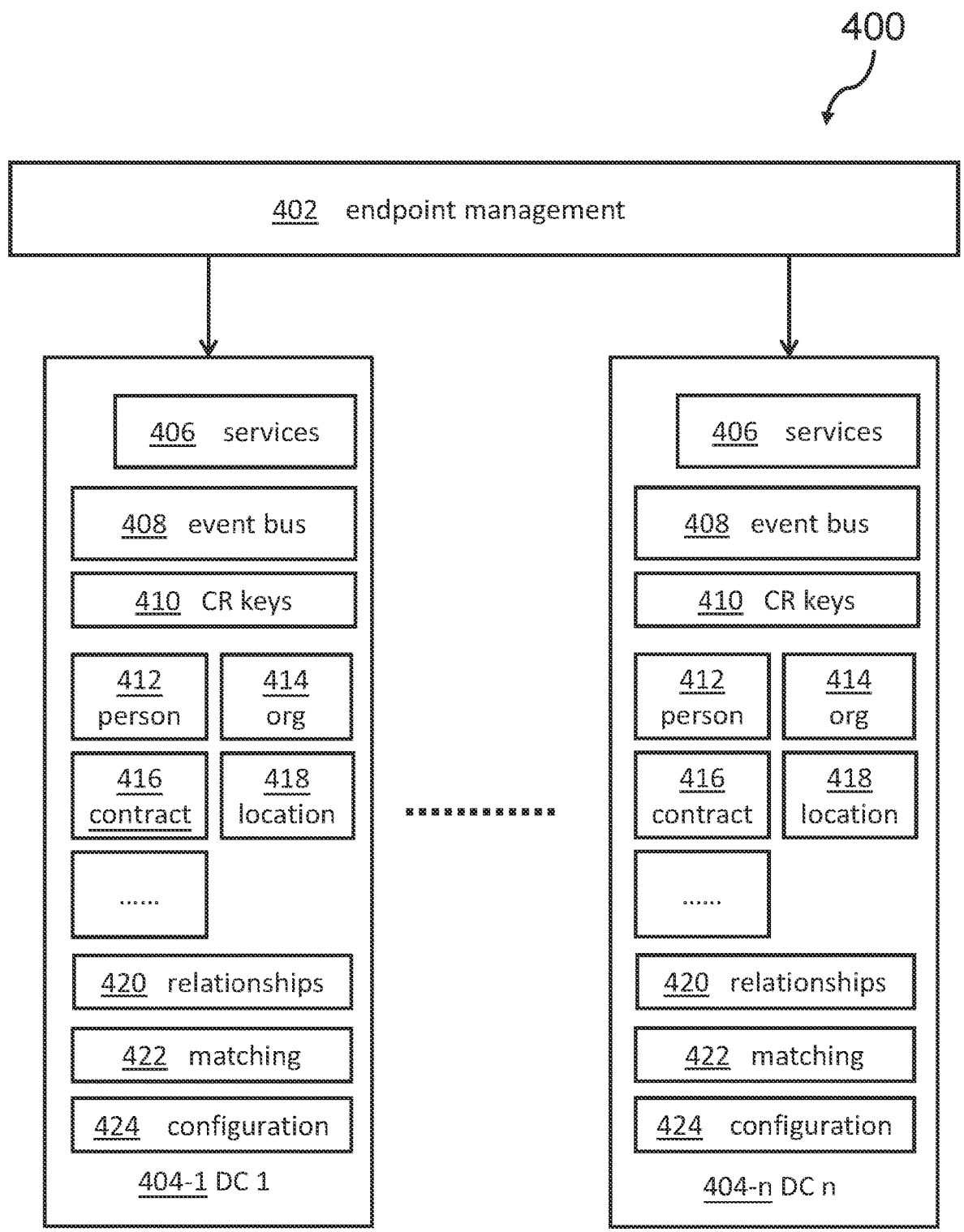
FIG. 4 depicts an example of an architecture diagram of the distributed data management system, according to some embodiments.

FIG. 4 shows an embodiment of an architecture diagram of the distributed data management system (DDMS) 400. The overall DDMS 400 is comprised of a plurality of nodes in different data centers 404-1 DC 1, ..., 404-n DC n. The data centers may be referred to collectively as data centers 404. The different nodes in the different data centers 404 are linked by the end point management layer 402 for client-side multi-layered service routing. The DDMS 400 is managed as a single logical system comprising the multiple nodes in different data centers 404, and potentially different geographies with different legal regulations for data privacy.

Each of the nodes comprises a multilayer architecture. The endpoint management layer 402 controls how service requests for data are routed to the various endpoint providers in the data centers 404. The services 406 layer provides CRUD services (create, read, update, delete) to read, write, and/or modify the data in the storage systems (not shown) of the nodes. The core functionality of this services layer 406 is the same in all data centers; however, local rules that are distributed across local configuration files may enforce different data integrity restrictions. For example, a certain party-contract rule might only be applicable in a single country. The services layer scales horizontally in each data center to support varying workloads.

The event bus 408 is instrumental for a publish-and-subscribe mechanism so that external applications can use it to access and change the data they are interested in and which they are permitted to see and access. Furthermore, the event bus 408 is also used to communicate change events—i.e., changes to data and/or configurations—between the nodes of the DDMS 400.

The data layer includes at least three components: e.g., records/entities such as person 412, organization 414, contract 416, location 418 and so on. Additionally, customer interaction data on various communication channels may also be recorded. Each node of the DDMS has a node specific subset of the records/entities which are permitted to be stored in the geographic location of the node. Therefore, the nodes may usually have different subsets of all records/entities known to the overall DDMS.

The relationships 420 layer also stores interdependencies between records or entities. In some instances, it may only include the unique identifiers (GUID, see above) of the involved records or entities and the relationship with the relationship properties. In particular, the layer for personal identification information (PII) (e.g., person layer 412) is not exposed so that it cannot be shared across country borders. Furthermore, the CR (cross reference) key layer 410 may be responsible for two things: (i) a unique global key assignment for all data objects and (ii) keeping track of which node or nodes has/have a copy of a certain data object or data record. Thereby, the CR keys may be synchronized across all partitions so that the copies on each partition are identical. It should also be mentioned that there is a 1:1 relationship between a data center and a partition. Hence, each data center manages its own partition data.

The service of the matching 422 layer is invoked whenever a creator update service is called for a master data object for which a matching algorithm has to be configured. Lastly, the configuration layer 424 stores and/or manages global and node specific configuration data, including rules governing under which circumstances records can be replicated from one node to another in a different geography.

Figure 5:
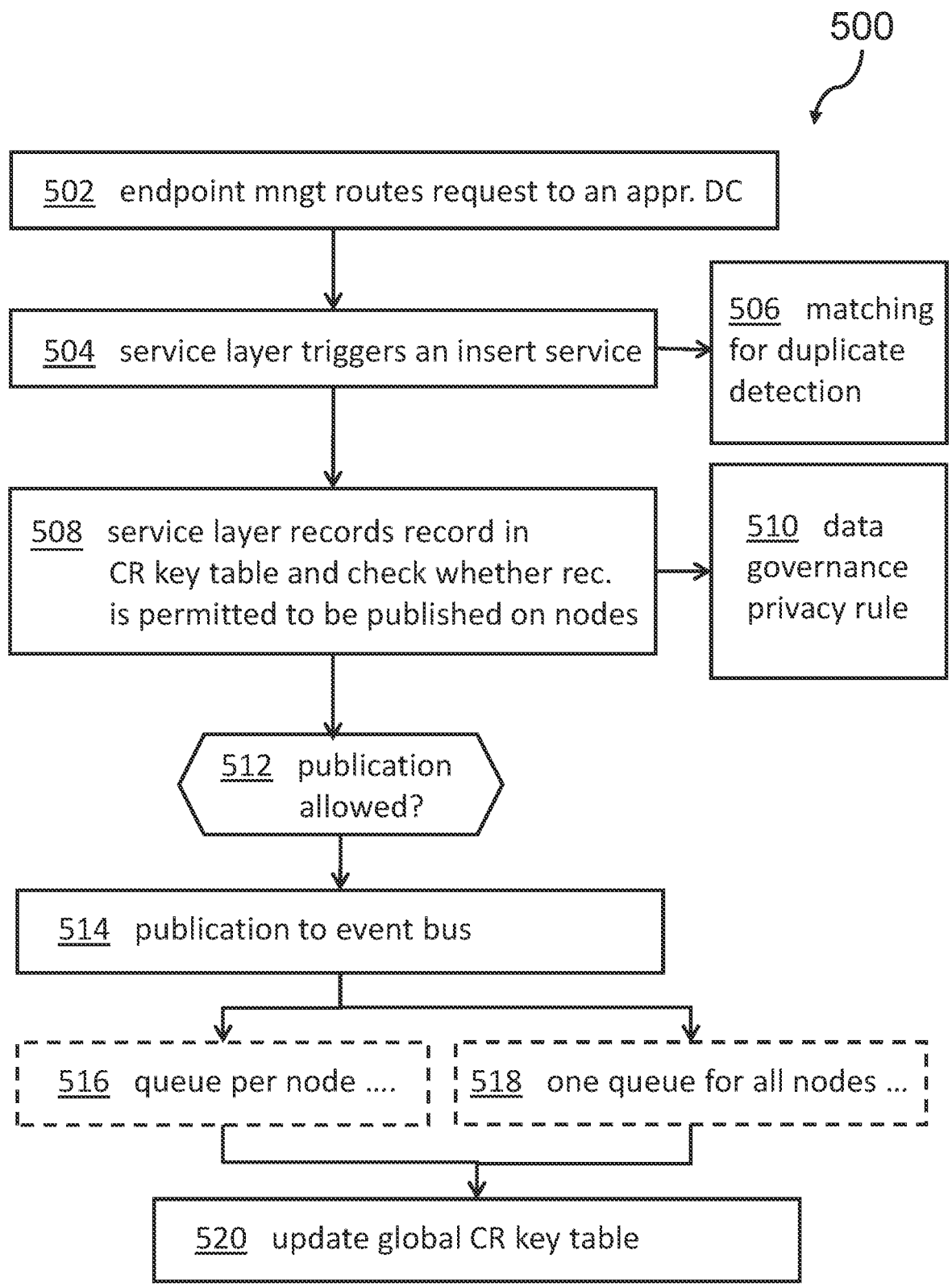
FIG. 5 depicts an exemplary flowchart of an insert operation for an entity, according to some embodiments.

FIG. 5 shows an exemplary flowchart 500 of an insert operation for an entity. Firstly, the endpoint management routes, 502, a request to the appropriate data center. The service layer (FIG. 4, 406) triggers, 504, the insert service to perform the insert service under the guise of using the matching function 506 for a duplicate detection. Thereby, the matching component might have different configuration for each of the data center nodes to handle data specifics of the records hosted on that particular node.

Once the insert service is finished writing the data to the local node records in the cross reference key table (not shown), the record then exists on the specific node. Thereby, the insert service checks, 508, whether or not that particular record is permitted to be published to other nodes. This check leverages the data governance privacy rules set 510— i.e., the placement condition rule—which is part of the configuration, as well as potentially available consent information of the record itself.

If the record is permitted to be published (determination: "publication allowed?", 512), the record is published to the event bus (FIG. 4, 408) using a publish/subscribe technique. This step can be implemented in multiple ways which is indicated by the dashed boxes 516, 518. In a first alternative 516, for each node a single queue is managed individually (i.e., a queue per node), in which case the record being published gets the metadata attached into which zones it is permitted to be accessed. In this case, the subscriber needs to look at the metadata to see if the message is permitted to be processed into the local node. In a second alternative 518, one queue node is used in the system, the publish process would create a message for each queue, and the node is permitted to access the record. If the message is permitted to be processed, then the publish process can continue. If the message is not permitted to be processed, that specific subscriber would be forced to ignore the processing. Further, if the record was not permitted to be published in 512, the record may not be published to the event bus in 514 and instead there may not be any publication of the record.

The final step in this flowchart is to update, 520, the global cross-reference (CR) key table, indicating that the record is now also being added on the node that processed it into its local persistence.

Figure 6:
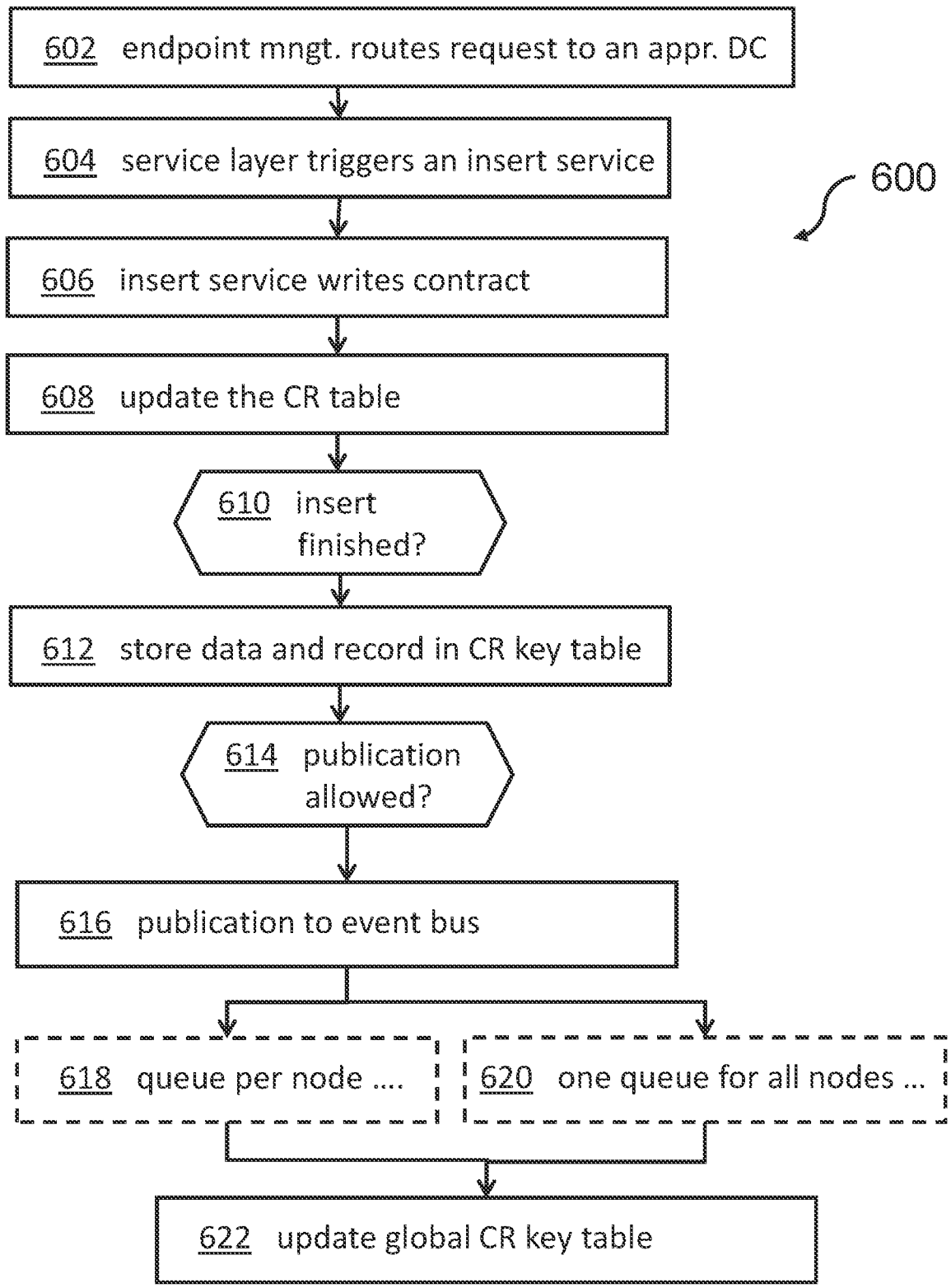
FIG. 6 depicts an exemplary flowchart of an insert operation for a contract and a party contract relationship, according to some embodiments.

FIG. 6 shows an exemplary flowchart 600 of an insert operation for a contract and a party contract relationship. In this scenario, it is assumed that at least one party record (e.g., a party record of a person or organization) does not exist on the storage of the local data center. Otherwise, it would be a straightforward process as described in the context of FIG. 5 for the default insert scenario. Firstly, in flowchart 600, the endpoint management routes, 602, the request to the appropriate data center. The service layer triggers, 604, the insert service for execution, under the guise of using the matching service/function for duplicate detection, as described in the context of FIG. 5. In some instances, the matching component might have different configurations per each of the data center nodes to deal with the data specifics of the records hosted on that particular node.

Further, the insert service for the scenario can be implemented in at least two alternative approaches. In a first alternative approach, the insert operation for a party— contract relationship creation is a composite service comprised of two steps. In the first step of the composite service, it is checked if the party and the contract exist on the local node where this relationship should be created and if that is not the case, a lookup is done to find out where the party record is located to pick-up the correct ID so that the CR table can be correctly maintained. In a second step, the party-contract relationship is added to the node where it should be created.

Alternatively, it may be assumed that a search has been done before the insert was triggered. In this case the contract information and at least one party ID of the party are transferred from another node.

Next, the insert service writes, 606—i.e., stores—the contract data. To create the relationship, the insert service creates a relationship instance with the contract ID and the party ID (ID=identifier). However, only the party ID as part of the party-contract relationship object is stored on this local node but not the party record itself, because the party record did not have a placement permission to replicate it over to this node. In addition, the insert of the party-contract relationship must update, 608, the CR key table indicating that the party ID has been used for the relationship instance on this node. This is necessary because in a delete scenario, the CR key table needs to be checked whether or not a particular entity is used on another node. If that is the case, the delete query is turned into an orchestrated process between the involved nodes.

In this example, if the party on another node is requested to be deleted, based on the CR lookup it would be known that there is the party-contract relationship using the unique ID of that party in that relationship—so the delete for such a party can only happen if and only if the related relationships are permitted for deletion as well. Otherwise, the deletion of that party needs to be rejected to ensure referential consistency across nodes factoring in the placement constraints.

Once the insert is finished (determination 610), the data is stored, 612, on the local node—i.e., on the related storage system—and also recorded in the CR key table that the contract record exists on this node.

The remaining steps of flowchart 600—publication allowed 614, publication to the event bus, 616, a nodes queue, 618, a queue for all nodes, 620 and the update of the global CR key table, 622—are equivalent to the steps in FIG. 5 with corresponding descriptions and do not need a repeated description.

Figure 7:
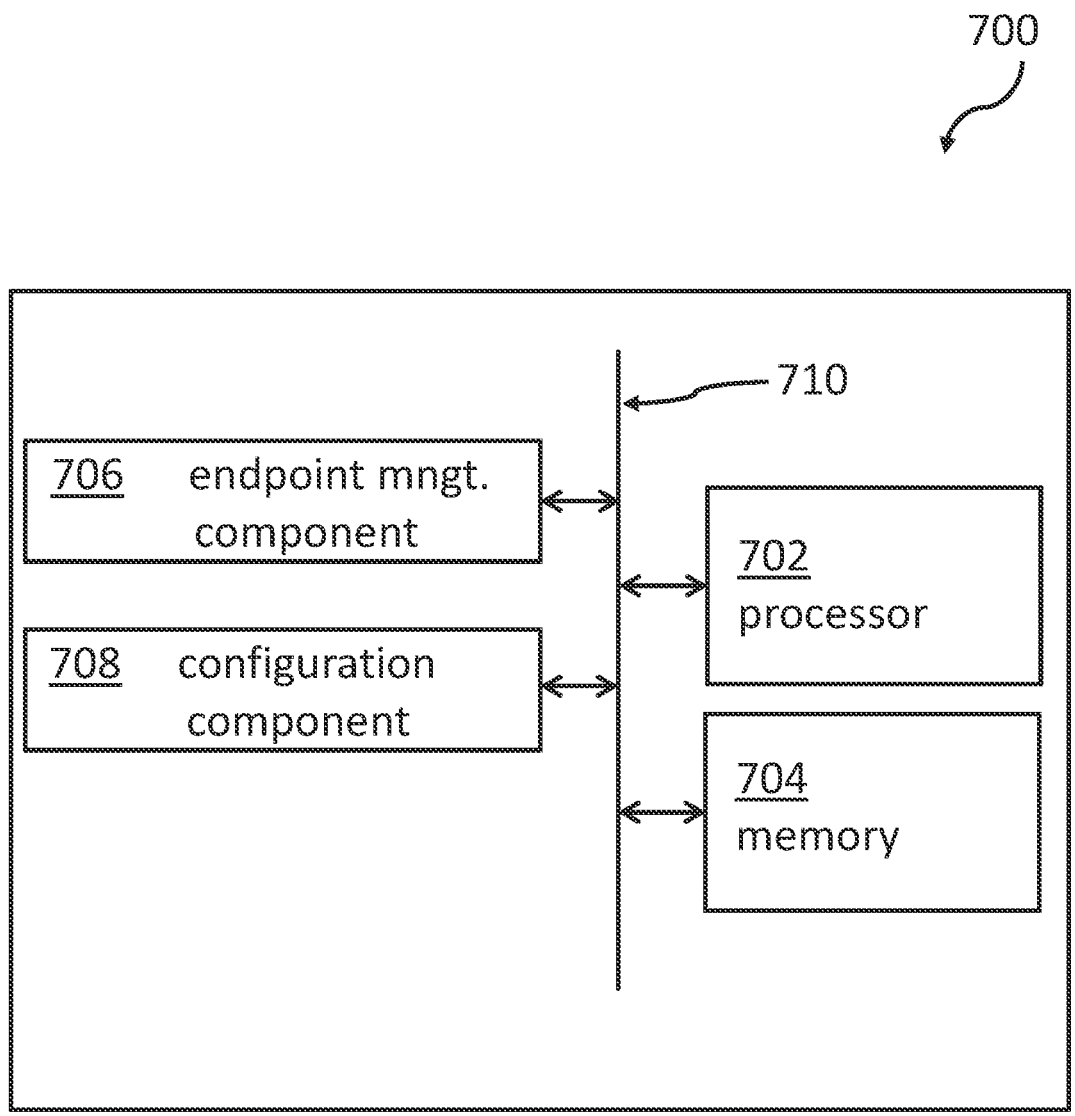
FIG. 7 depicts a block diagram of an example distributed data management system for managing data records subject to placement condition rules, according to some embodiments.

FIG. 7 shows a block diagram of one embodiment of a node of the distributed data management system 700 for managing data records subject to placement condition rules, where the distributed data management system comprises a plurality of nodes. The distributed data management system 700 includes a processor 702 and a memory 704 that is communicatively coupled to the processor 702. The memory 704 stores program code portions that, when executed, enable the processor 702, to receive, by an endpoint management component 706 (which, in some instances, corresponds to FIG. 4, 402) of the distributed data management system, a request for a data record, and route, by the endpoint management component 706 of the node 700 of a distributed data management system. The request for the data record may be to a node of the distributed data management system. Furthermore, the processor may be configured to: upon determining that the request is a create request, verify, by a service component 708 (which may, in some instances, correspond to FIG. 4, 406) of the DDMS, a placement condition rule for the data record to be created, wherein the placement condition rule is retrieved from a configuration component 710 (which may, in some instances, correspond to FIG. 4, 424) of the DDMS.

It shall also be mentioned that all functional units, modules and functional blocks—in particular the processor 702, the memory 704, the endpoint management component 706, and the configuration component 708, as well as, in some instances, the other components shown in the context of FIG. 4—may be communicatively coupled to each other for signal or message exchange in a selected 1:1 manner. Alternatively, the functional units, modules and functional blocks can be linked to a system internal bus system 710 for a selective signal or message exchange.

Figure 8:
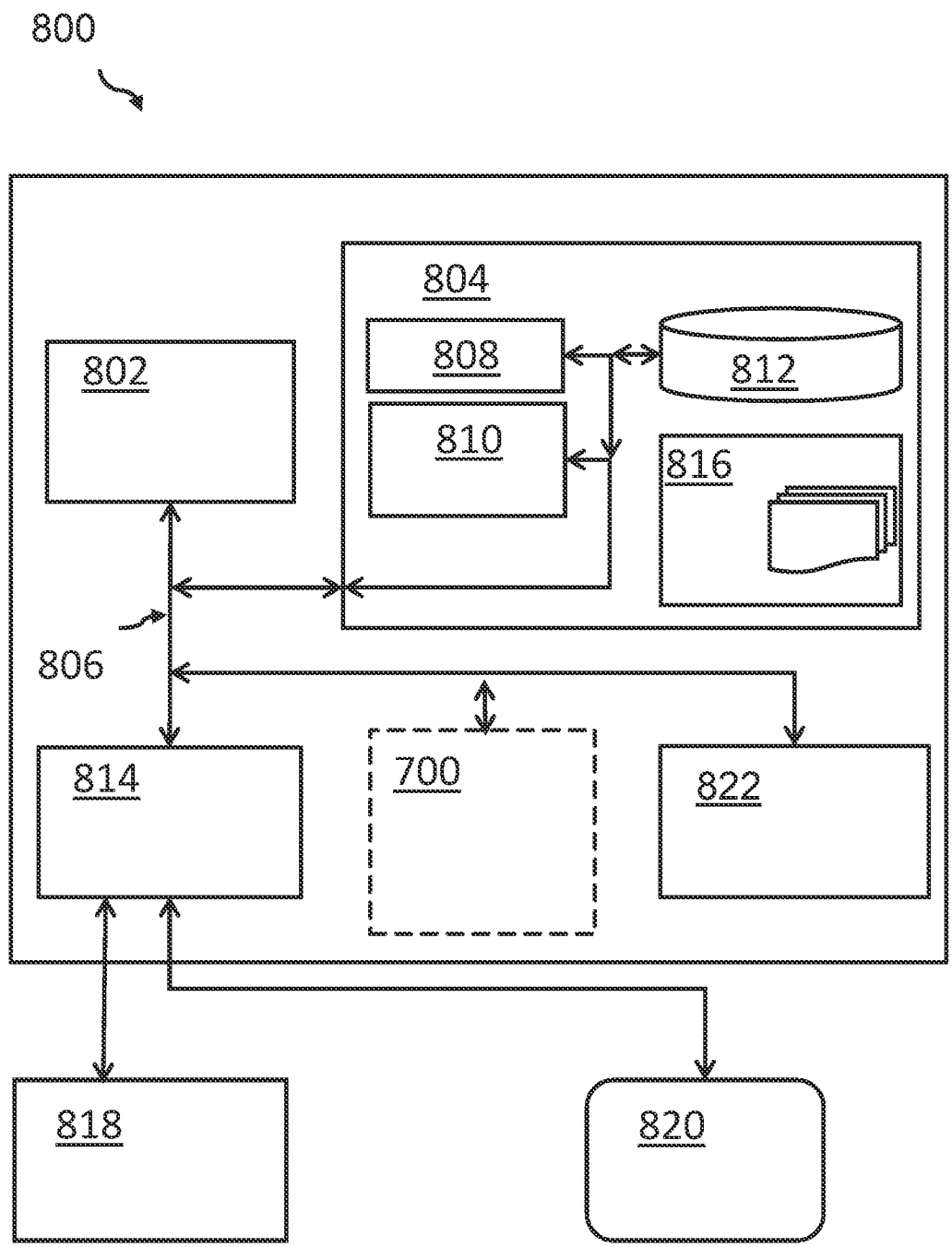
FIG. 8 depicts an example computing system comprising the distributed data management system, according to some embodiments.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples include, but are not limited to: microcode, device drivers, redundant processing units, external disk drive arrays, RAID systems, tape drives, and data archival storage systems, etc.

Additionally, the node 700 of distributed data management system for managing data records subject to placement condition rules may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Thus, the inventive concept may be summarized in the following clauses:
1. A computer-implemented method for managing data records subject to placement condition rules in a distributed data management system comprising a plurality of nodes, the method comprising
   receiving, by an endpoint management component of the distributed data management system, a request for a data record,
   routing, by the endpoint management component of the distributed data management system, the request to a node of the distributed data management system, and
   upon determining that the request is a create request, verifying, by a service component of the distributed data management system, a placement condition rule for the data record to be created, wherein the placement condition rule is retrieved from a configuration component of the distributed data management system.
2. The method according to clause 1, also comprising
   upon determining that the request is a read request, providing, by the service component of the distributed data management system, a result for the request to the endpoint management component.
3. The method according to clause 2, wherein the providing is performed in accordance with an access permission associated with the given record.
4. The method according to any of the preceding clauses, also comprising
   upon determining that the placement condition rule does not permit a storage of the data record on the node, storing a pointer to the record on the node.
5. The method according to any of the preceding clauses, wherein the distributed data management system is adapted for storing data records on nodes located in geographically different areas in which a different placement condition rule, different access permissions and/or different data governance rules have to be applied.
6. The method according to any of the preceding clauses, wherein for each data record in the distributed data management system a global unique identifier is maintained.
7. The method according to any of the preceding clauses, wherein the distributed data management system is a master data management system.
8. The method according to any of the preceding clauses, wherein data records are replicated to another node of the plurality of nodes of the distributed data management system only if not violating a placement condition rule.
9. The method according to any of the preceding clauses, wherein the distributed data management system comprises a data layer comprising at least one selected out of the group consisting of data records, relationship records defining relationships between data records or entities, and global unified identifiers which are used to maintain a reference record about each record and relationships between records.
10. The method according to any of the preceding clauses, wherein a communication between the plurality of nodes is performed via an event bus of which each of the nodes executes an event bus service.
11. The method according to any of the preceding clauses, wherein the distributed data management system also comprises a matching service which is invoked whenever a data record is created or updated.
12. The method according to any of the preceding clauses, also comprising
    upon an update request for data in the distributed data management system, determining whether a relationship to another data record in the distributed data management system has been deleted.
13. The method according to any of the preceding clauses, also comprising
    upon a delete operation for a data record in the distributed data management system, determining whether a copy of the record exists on another node of the distributed data management system.
14. A distributed data management system for managing data records subject to placement condition rules, wherein the distributed data management system comprises a plurality of nodes, the distributed data management system comprising
    a processor and a memory, communicatively coupled to the processor, wherein the memory stores program code portions that, when executed, enable the processor, to
    receive, by an endpoint management component of the distributed data management system, a request for a data record,
    route, by the endpoint management component of the distributed data management system, the request to a node of the distributed data management system, and
    upon determining that the request is a create request, verify, by a service component of the distributed data management system, a placement condition rule for the data record to be created, wherein the placement condition rule is retrieved from a configuration component of the distributed data management system.
15. The distributed data management system according to clause 14, wherein the processor is also enabled to:
    upon determining that the request is a read request, provide, by the service component of the distributed data management system, a result for the request to the endpoint management component.
16. The distributed data management system according to clause 15, wherein the providing is performed in accordance with an access permission associated with the given record.
17. The distributed data management system according to any of the clauses 14 to 16, wherein the processor is also enabled to:
    upon determining that the placement condition rule does not permit a storage of the data record on the node, store a pointer to the record on the node.
18. The distributed data management system according to any of the clauses 13 to 17, wherein the distributed data management system is adapted for storing data records on nodes located in geographically different areas in which a different placement condition rule, different access permissions and/or different data governance rules have to be applied.
19. The distributed data management system according to any of the clauses 14 to 18, wherein for each data record in the distributed data management system a global unique identifier is maintained.
20. The distributed data management system according to any of the clauses 14 to 19, wherein the distributed data management system is a master data management system.
21. The distributed data management system according to any of the clauses 14 to 20, wherein data records are replicated to another node of the plurality of nodes of the distributed data management system only if not violating a placement condition rule.

22. The distributed data management system according to any of the clauses 14 to 21, wherein the distributed data management system comprises a data layer comprising at least one selected out of the group consisting of data records, relationship records defining relationships between data records or entities, and global unified identifiers which are used to maintain a reference record about each record and relationships between records.

23. The distributed data management system according to any of the clauses 14 to 22, also comprising and event bus facilitating a communication between the plurality of nodes, wherein each of the nodes is adapted to execute an event bus service.

24. The distributed data management system according to any of the clauses 14 to 23, wherein the processor is also enabled for:
upon an update request for data in the distributed data management system, determining whether a relationship to another data record in the distributed data management system has been deleted, and/or
upon a delete operation for a data record in the distributed data management system, determining whether a copy of the record exists on another node of the distributed data management system.

25. A computer program product for managing data records subject to placement condition rules, wherein the distributed data management system comprises a plurality of nodes, the computer program product comprising a computer readable storage medium having program instructions embodied therewith, said program instructions being executable by one or more computing systems or controllers to cause said one or more computing systems to
receive, by an endpoint management component of the distributed data management system, a request for a data record,
route, by the endpoint management component of the distributed data management system, the request to a node of the distributed data management system, and
upon determining that the request is a create request, verify, by a service component of the distributed data management system, a placement condition rule for the data record to be created, wherein the placement condition rule is retrieved from a configuration component of the distributed data management system.

What is claimed is:

1. A computer-implemented method for managing data records subject to placement condition rules in a distributed data management system comprising a plurality of nodes, the method comprising:
receiving, by an endpoint management component of the distributed data management system, a request for a data record;
routing, by the endpoint management component of the distributed data management system, the request to a node of the distributed data management system;
upon determining that the request is a create request, verifying, by a service component of the distributed data management system, a placement condition rule for the data record, wherein the placement condition rule is retrieved from a configuration component of the distributed data management system; and
upon an update request for data in the distributed data management system, determining whether a relationship between the data for which an update was requested to another data record in the distributed data management system has been deleted.

2. The method according to claim 1, further comprising:
receiving, by an endpoint management component of the distributed data management system, a second request for a second data record; and
upon determining that the second request is a read request, providing, by the service component of the distributed data management system, a result for the request to the endpoint management component.

3. The method according to claim 2, wherein the providing is performed in accordance with an access permission associated with the given record.

4. The method according to claim 1, further comprising:
upon determining that the placement condition rule does not permit a storage of the data record on the node, storing a pointer to the record on the node.

5. The method according to claim 1, wherein the distributed data management system is adapted for storing data records on nodes located in geographically different areas in which at least one of a different placement condition rule, different access permissions, and different data governance rules have to be applied.

6. The method according to claim 1, wherein, for each data record in the distributed data management system, a global unique identifier is maintained.

7. The method according to claim 1, wherein the distributed data management system is a master data management system.

8. The method according to claim 1, further comprising:
determining that the data records are not violating the placement condition rule; and
replicating, in response to the determining that the data records are not violating the placement condition rule, the data records to another node of the plurality of nodes of the distributed data management system.

9. The method according to claim 1, wherein the distributed data management system comprises a data layer comprising at least one of data records, relationship records defining relationships between data records or entities, and global unified identifiers which are used to maintain a reference record about each record and relationships between records.

10. The method according to claim 1, wherein a communication between the plurality of nodes is performed via an event bus of which each of the nodes executes an event bus service.

11. The method according to claim 1, wherein the distributed data management system comprises a matching service which is invoked in response to a data record being created or updated.

12. The method according to claim 1, further comprising:
upon a delete operation for a data record in the distributed data management system, determining whether a copy of the record exists on another node of the distributed data management system.

13. A distributed data management system for managing data records subject to placement condition rules, wherein the distributed data management system comprises a plurality of nodes, the distributed data management system comprising:
a processor and a memory, communicatively coupled to the processor, wherein the processor is configured to:
receive, by an endpoint management component of the distributed data management system, a request for a data record;

route, by the endpoint management component of the distributed data management system, the request to a node of the distributed data management system;

upon determining that the request is a create request, verify, by a service component of the distributed data management system, a placement condition rule for the data record, wherein the placement condition rule is retrieved from a configuration component of the distributed data management system; and upon an update request for data in the distributed data management system, determine whether a relationship between the data for which an update was requested to another data record in the distributed data management system has been deleted.

14. The distributed data management system according to claim 13, wherein the processor is further configured to:
receive, by an endpoint management component of the distributed data management system, a second request for a second data record; and
upon determining that the second request is a read request, provide, by the service component of the distributed data management system, a result for the request to the endpoint management component.

15. The distributed data management system according to claim 14, wherein the providing is performed in accordance with an access permission associated with the given record.

16. The distributed data management system according to claim 13, wherein the processor is further configured to:
upon determining that the placement condition rule does not permit a storage of the data record on the node, store a pointer to the record on the node.

17. The distributed data management system according to claim 13, wherein the distributed data management system is adapted for storing data records on nodes located in geographically different areas in which at least one of a different placement condition rule, different access permissions, and different data governance rules have to be applied.

18. The distributed data management system according to claim 13, wherein, for each data record in the distributed data management system, a global unique identifier is maintained.

19. The distributed data management system according to claim 13, wherein the distributed data management system is a master data management system.

20. The distributed data management system according to claim 13, further configured to:
determine that the data records are not violating the placement condition rule; and
replicate, in response to the determining that the data records are not violating the placement condition rule, the data records to another node of the plurality of nodes of the distributed data management system.

21. The distributed data management system according to claim 13, wherein the distributed data management system comprises a data layer comprising at least one of data records, relationship records defining relationships between data records or entities, and global unified identifiers which are used to maintain a reference record about each record and relationships between records.

22. The distributed data management system according to claim 13, further comprising an event bus facilitating a communication between the plurality of nodes, wherein each of the nodes is adapted to execute an event bus service.

23. A computer program product for managing data records subject to placement condition rules in a distributed data management system comprising a plurality of nodes, the computer program product comprising a computer readable storage medium having program instructions embodied therewith, the program instructions executable by a server to cause the server to perform a method, the method comprising:
receiving, by an endpoint management component of the distributed data management system, a request for a data record;
routing, by the endpoint management component of the distributed data management system, the request to a node of the distributed data management system;
upon determining that the request is a create request, verifying, by a service component of the distributed data management system, a placement condition rule for the data record, wherein the placement condition rule is retrieved from a configuration component of the distributed data management system; and
upon an update request for data in the distributed data management system, determining whether a relationship between the data for which an update was requested to another data record in the distributed data management system has been deleted.

* * * * *